US011212729B2

(12) United States Patent
Jiang et al.

(10) Patent No.: US 11,212,729 B2
(45) Date of Patent: Dec. 28, 2021

(54) METHOD AND SYSTEM FOR ESTABLISHING CONNECTIONLESS MESH NETWORK ROUTE

(71) Applicant: Espressif Systems (Shanghai) Co., Ltd., Shanghai (CN)

(72) Inventors: Jiangjian Jiang, Shanghai (CN); Yuexia Qi, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/631,146

(22) PCT Filed: Jan. 8, 2019

(86) PCT No.: PCT/CN2019/070742
§ 371 (c)(1),
(2) Date: Jan. 14, 2020

(87) PCT Pub. No.: WO2019/169952
PCT Pub. Date: Sep. 12, 2019

(65) Prior Publication Data
US 2020/0396669 A1 Dec. 17, 2020

(30) Foreign Application Priority Data
Mar. 7, 2018 (CN) .......................... 201810185937.9

(51) Int. Cl.
*H04W 40/12* (2009.01)
*H04W 40/24* (2009.01)
*H04W 84/18* (2009.01)

(52) U.S. Cl.
CPC .......... *H04W 40/12* (2013.01); *H04W 40/246* (2013.01); *H04W 84/18* (2013.01)

(58) Field of Classification Search
None
See application file for complete search history.

(56) References Cited

U.S. PATENT DOCUMENTS

2009/0003232 A1* 1/2009 Vaswani ................. H04L 45/00
370/252
2011/0292876 A1* 12/2011 Morris ................... H04W 76/10
370/328

(Continued)

FOREIGN PATENT DOCUMENTS

CN       1849597 A     10/2006
CN     101056240 A     10/2007

(Continued)

*Primary Examiner* — Brian S Roberts
(74) *Attorney, Agent, or Firm* — Reinhart Boerner Van Deuren P.C.

(57) ABSTRACT

Disclosed are a method and system for establishing a route in a connectionless mesh network. The method comprises the following steps of: a sink device periodically broadcasting information to one or more surrounding devices of the sink device, wherein the information comprises information indicating the sink device as a sink, a MAC address of the sink device, and a signal strength between the sink device and an external router; a non-sink device periodically monitoring information broadcast by one or more surrounding devices of the non-sink device, and determining whether the information broadcast by the sink device is present; if so, the non-sink device selecting a sink device having a highest signal strength therewith as a next hop device, and the non-sink device periodically broadcasting information to the one or more surrounding devices of the non-sink device, wherein the information comprises a number of hops from the non-sink device to the sink device, a MAC address of the sink device, and the signal strength between the non-sink device and the sink device; if not, the non-sink device selecting a device having a highest signal strength therewith as the next hop device thereof, and the non-sink device periodically broadcasting information to the one or more surrounding devices of the non-sink device, wherein the information comprises the number of hops from the non- (Continued)

sink device to the sink device, a MAC address of the next hop device, and the signal strength between the non-sink device and the next hop device. The present invention may enable each device to find and maintain a route having the highest signal strength to a network sink.

7 Claims, 1 Drawing Sheet

(56) References Cited

U.S. PATENT DOCUMENTS

| | | | |
|---|---|---|---|
| 2012/0233326 A1* | 9/2012 | Shaffer | H04W 40/023 709/225 |
| 2015/0256401 A1* | 9/2015 | Zinger | H04L 41/14 370/401 |
| 2015/0334629 A1* | 11/2015 | Patil | H04L 45/123 370/338 |
| 2018/0198701 A1* | 7/2018 | Kosugi | H04L 45/02 |
| 2018/0351850 A1 | 12/2018 | Rahkala et al. | |

FOREIGN PATENT DOCUMENTS

| | | |
|---|---|---|
| CN | 101771615 | 7/2010 |
| CN | 102056262 A | 5/2011 |
| CN | 105516000 | 4/2016 |
| CN | 106658645 A | 5/2017 |
| CN | 108401227 | 8/2018 |
| WO | WO 2018/009468 | 1/2018 |

\* cited by examiner

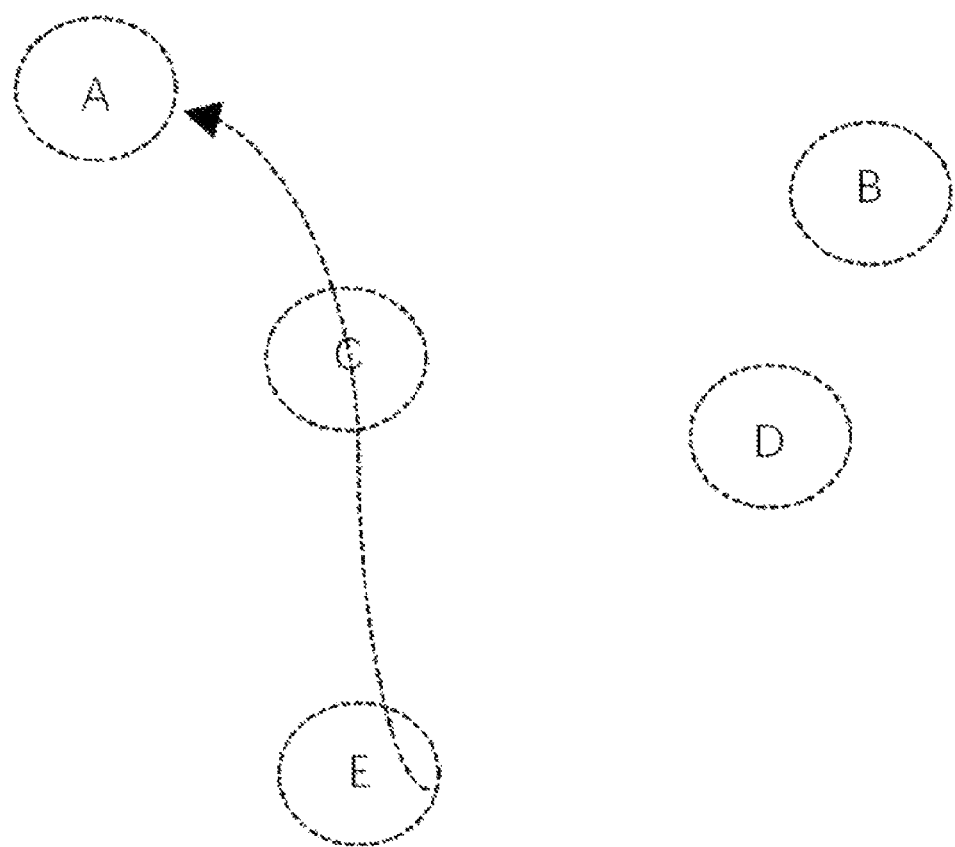

METHOD AND SYSTEM FOR ESTABLISHING CONNECTIONLESS MESH NETWORK ROUTE

TECHNICAL FIELD

The present invention relates to a wireless communication network technology, and in particular to a method and system for establishing a route in a connectionless mesh network.

BACKGROUND ART

With continuous development of the wireless network technologies and emerging of various new applications, there is an urgent need for wireless networks able to access the Internet to meet sharply increasing user demands. Traditional routing based on the minimum number of hops is simple and fast; however, for a connectionless mesh network, the existing access method is somewhat limited in that a route with the minimum number of hops may not ensure the best signal. Therefore, there is a need for an implementation method for connectionless mesh communication, thereby reducing data loss rate and improving quality of service.

SUMMARY OF THE INVENTION

An object of the present invention is to provide a method and system for establishing a route in a connectionless mesh network, in order to find, dynamically perform a takeover at any time to, and maintain a route having a highest signal strength to a network sink.

To achieve the aforementioned object, the present invention provides a method for establishing a route in a connectionless mesh network, including the steps of:

a sink device periodically broadcasting information to one or more surrounding devices of the sink device, wherein the information comprises information indicating the sink device as a sink, a MAC address of the sink device, and a signal strength between the sink device and an external router;

a non-sink device periodically monitoring information broadcast by one or more surrounding devices of the non-sink device, and determining whether the information broadcast by the sink device is present;

if so, the non-sink device selecting a sink device having a highest signal strength therewith as a next hop device, and the non-sink device periodically broadcasting information to the one or more surrounding devices of the non-sink device, wherein the information comprises a number of hops from the non-sink device to the sink device, a MAC address of the sink device, and the signal strength between the non-sink device and the sink device;

if not, the non-sink device selecting a device having a highest signal strength therewith as the next hop device thereof, and the non-sink device periodically broadcasting information to the one or more surrounding devices of the non-sink device, wherein the information comprises the number of hops from the non-sink device to the sink device, a MAC address of the next hop device, and the signal strength between the non-sink device and the next hop device.

In the aforementioned method for establishing a route in a connectionless mesh network, the information may be broadcast through a management frame or a control frame.

In the aforementioned method for establishing a route in a connectionless mesh network, the management frame may be a beacon.

The present invention also provides a system for establishing a route in a connectionless mesh network, which includes a plurality of sink devices and a plurality of non-sink devices;

wherein each of the plurality of the sink devices comprises:

a first monitoring module for detecting a signal strength between the sink device and an external router; and a first broadcast module connected with the first monitoring module, which is operable to periodically broadcast information to one or more surrounding devices of the sink device, wherein the information comprises information indicating the sink device as a sink, a MAC address of the sink device, and a signal strength between the sink device and an external router;

wherein each of the plurality of the non-sink devices comprises:

a second monitoring module for monitoring information broadcast by one or more surrounding devices of the non-sink device and detecting signal strengths between the non-sink device and the one or more surrounding devices of the non-sink device; and a second broadcast module connected with the second monitoring module, which is operable to determine whether the information broadcast by the sink devices is present; if so, the non-sink device selects a sink device having a highest signal strength therewith as a next hop device thereof, and the non-sink device periodically broadcasts information to the one or more surrounding devices of the non-sink device, wherein the information comprises a number of hops from the non-sink device to the sink device, a MAC address of the sink device, and the signal strength between the non-sink device and the sink device; if not, the non-sink device selects a device having a highest signal strength therewith as the next hop device, and the non-sink device periodically broadcasts information to the one or more surrounding devices of the non-sink device, wherein the information comprising the number of hops from the non-sink device to the sink device, a MAC address of the next hop device of the non-sink device, and the signal strength between the non-sink device and the next hop device.

In the system for establishing a route in a connectionless mesh network, each sink device and each non-sink device may further comprise a data forwarding module, respectively, for forwarding data to the external router connected with the sink device according to the established route in the connectionless mesh network.

In the system for establishing a route in a connectionless mesh network, the first broadcast module may comprise:

a first encapsulation unit for encapsulating the information comprising the information indicating the sink device as a sink, the MAC address of the sink device, and the signal strength between the sink device and the external router into a management frame or a control frame; and a first transmitting unit connected with the first encapsulation unit, which is operable to periodically broadcast the management frame or the control frame to the one or more surrounding devices of the sink device.

In the system for establishing a route in a connectionless mesh network, the second broadcast module may comprise:

a determination unit for determining whether the information broadcast by the sink device is present;

a selection unit connected with the determination unit, which is operable to, if the information broadcast by the sink device is present, select a sink device having a highest signal strength with the non-sink device as a next hop device; and, if not, select a device having the highest signal strength with the non-sink device as the next hop device;

a second encapsulation unit connected with the selection unit, which is operable to, if the information broadcast by the sink device is present, encapsulate the information comprising the number of hops from the non-sink device to the sink device, the MAC address of the sink device, and the signal strength between the non-sink device and the sink device into the management frame or the control frame; and, if not, encapsulate the information comprising the number of hops from the non-sink device to the sink device, the MAC address of the next hop device, and the signal strength between the non-sink device and the next hop device into the management frame or the control frame; and a second transmitting unit connected with the second encapsulation unit, which is operable to periodically broadcast the management frame or the control frame to the one or more surrounding devices of the non-sink device.

As compared with the prior art, the present invention has the following beneficial effects:

in a huge mesh network, not every device may directly scan and find a network sink, but the method and system for establishing a route in a connectionless mesh network according to the present invention may enable each device to find a route having a highest signal strength to the network sink, and may dynamically perform a takeover at any time to, and maintain a best route to the network sink.

BRIEF DESCRIPTION OF THE DRAWINGS

FIG. 1 is a schematic view of establishing a route having the highest signal strength for device E to a sink in one embodiment of the present invention.

DETAILED DESCRIPTION OF THE PREFERRED EMBODIMENTS

The present invention is further described through particular embodiments in combination with accompany drawings, with the embodiments being merely for illustrating the present invention, rather than limiting the protection scope of the present invention.

The present invention provides a method for establishing a route in a connectionless mesh network, including the steps of:

a sink device (which is a device in the network that is capable of accessing an external network) periodically broadcasting information to one or more surrounding devices of the sink device, wherein the information comprises information indicating the sink device as a sink (the number of hops to the sink is 0), a MAC address of the sink device, and a signal strength between the sink device and an external router;

a non-sink device (which is a device in the network that is not capable of accessing an external network) periodically monitoring information broadcast by one or more surrounding devices of the non-sink device, and determining whether the information broadcast by the sink device is present;

if so, the non-sink device selecting a sink device having a highest signal strength therewith as a next hop device, and the non-sink device periodically broadcasting information to the one or more surrounding devices of the non-sink device, wherein the information comprises a number of hops from the non-sink device to the sink device, a MAC address of the sink device, and the signal strength between the non-sink device and the sink device;

if not, the non-sink device selecting a device having a highest signal strength therewith as the next hop device thereof, and the non-sink device periodically broadcasting information to the one or more surrounding devices of the non-sink device, wherein the information comprises the number of hops from the non-sink device to the sink device, a MAC address of the next hop device, and the signal strength between the non-sink device and the next hop device.

Until each non-sink device in the network finishes monitoring and broadcasting, a route having the highest signal strength to the network sink is established for each non-sink device in the network.

In some embodiments, the information is broadcast through a management frame or a control frame.

In some embodiments, the management frame is a beacon.

The present invention also provides a system for establishing a route in a connectionless mesh network, which includes a plurality of sink devices and a plurality of non-sink devices;

wherein each of the plurality of the sink devices comprises:

a first monitoring module for detecting a signal strength between the sink device and an external router; and a first broadcast module connected with the first monitoring module, which is operable to periodically broadcast information to one or more surrounding devices of the sink device, wherein the information comprises information indicating the sink device as a sink, a MAC address of the sink device, and a signal strength between the sink device and an external router;

wherein each of the plurality of the non-sink devices comprises:

a second monitoring module for monitoring information broadcast by one or more surrounding devices of the non-sink device and detecting signal strengths between the non-sink device and the one or more surrounding devices of the non-sink device; and a second broadcast module connected with the second monitoring module, which is operable to determine whether the information broadcast by the sink devices is present; if so, the non-sink device selects a sink device having a highest signal strength therewith as a next hop device thereof, and the non-sink device periodically broadcasts information to the one or more surrounding devices of the non-sink device, wherein the information comprises a number of hops from the non-sink device to the sink device, a MAC address of the sink device, and the signal strength between the non-sink device and the sink device; if not, the non-sink device selects a device having a highest signal strength therewith as the next hop device, and the non-sink device periodically broadcasts information to the one or more surrounding devices of the non-sink device, wherein the information comprising the number of hops from the non-sink device to the sink device, a MAC address of the next hop device of the non-sink device, and the signal strength between the non-sink device and the next hop device.

In some embodiments, each sink device and each non-sink device further comprise a data forwarding module, respectively, for forwarding data to the external router connected with the sink device according to the established route in the connectionless mesh network.

In some embodiments, the first broadcast module comprises:

a first encapsulation unit for encapsulating the information comprising the information indicating the sink device as a sink, the MAC address of the sink device, and the signal strength between the sink device and the external router into a management frame or a control frame; and a first transmitting unit connected with the first encapsulation unit, which is operable to periodically broadcast the management frame or the control frame to the one or more surrounding devices of the sink device.

In some embodiments, the second broadcast module comprises:

a determination unit for determining whether the information broadcast by the sink device is present;

a selection unit connected with the determination unit, which is operable to, if the information broadcast by the sink device is present, select a sink device having a highest signal strength with the non-sink device as a next hop device; and, if not, select a device having the highest signal strength with the non-sink device as the next hop device;

a second encapsulation unit connected with the selection unit, which is operable to, if the information broadcast by the sink device is present, encapsulate the information comprising the number of hops from the non-sink device to the sink device, the MAC address of the sink device, and the signal strength between the non-sink device and the sink device into the management frame or the control frame; and, if not, encapsulate the information comprising the number of hops from the non-sink device to the sink device, the MAC address of the next hop device, and the signal strength between the non-sink device and the next hop device into the management frame or the control frame; and a second transmitting unit connected with the second encapsulation unit, which is operable to periodically broadcast the management frame or the control frame to the one or more surrounding devices of the non-sink device.

As shown in FIG. 1, devices A and B are sink devices connected to an external router; devices C, D, and E are non-sink devices; the devices C and D may monitor the devices A and B; while the device E may only monitor the devices C and D. The method for establishing a route in a connectionless mesh network according to the present invention is used to find a route with a highest signal strength for the device E to a sink as the following: the non-sink device C monitors and finds that the signal strength between the non-sink device C and the device A is −60 dB, the signal strength between the non-sink device C and the device B is −80 dB, and thus it selects the device A as a network sink; then, the non-sink device C broadcasts the number of hops of 1, the MAC address of the device A, and the signal strength of −60 dB between the non-sink device C and the device A to one or more surrounding devices; the non-sink device D monitors and finds that the signal strength between the non-sink device D and the device A is −80 dB, the signal strength between the non-sink device D and the device B is −50 dB, and thus selects the device B as a network sink; then, the non-sink device D broadcasts the number of hops of 1, the MAC address of the device B, and the signal strength of −50 dB between the non-sink device D and the device B to one or more surrounding devices; the non-sink device E monitors and finds that the signal strength between the non-sink device E and the device C is −60 dB, the signal strength between the non-sink device E and the device D is −70 dB, and thus its selects the device C as a next hop device; then non-sink device E broadcasts the number of hops of 2, the MAC address of the device C, and the signal strength of −60 dB between the non-sink device E and the device C to one or more surrounding devices. As a result, a route with a highest signal strength to a sink is found for the device E, i.e., from the device E to the device C and then to the device A.

In summary, the method and system for establishing a route in a connectionless mesh network according to the present invention may enable each device to find a route having the highest signal strength to a network sink, and to dynamically perform a takeover at any time to, and maintain a route having the highest signal strength to the network sink.

Although the content of the present invention has been described in detail through the aforementioned preferred embodiments, it should be recognized that the above description should not be considered as limiting the present invention. Upon reading the aforementioned content, it will be apparent to those skilled in the art that various modifications and substitutions may be made to the present invention. Therefore, the protection scope of the present invention shall be defined by the appended claims.

The invention claimed is:

1. A method for establishing a route in a connectionless mesh network, comprising the following steps of:

each sink device from a plurality of sink devices periodically broadcasting information to one or more surrounding devices of the sink device, wherein the information comprises information indicating the sink device as a sink, a MAC address of the sink device, and a signal strength between the sink device and an external router;

each non-sink device from a plurality of non-sink devices periodically monitoring information broadcast by one or more surrounding devices of the non-sink device, and determining whether the information broadcast by the sink device is present;

if so, the non-sink device selecting a sink device having a highest signal strength therewith from the plurality of sink devices as a next hop device, and the non-sink device periodically broadcasting information to one or more surrounding devices of the non-sink device, wherein the information comprises a number of hops from the non-sink device to the sink device having a highest signal strength therewith a MAC address of the sink device having a highest signal strength therewith, and the signal strength between the non-sink device and the sink device having a highest signal strength therewith;

if not, the non-sink device selecting a device having a highest signal strength therewith as the next hop device thereof, and the non-sink device periodically broadcasting information to one or more surrounding devices of the non-sink device, wherein the information comprises the number of hops from the non-sink device to a sink device from the plurality of the sink devices, a MAC address of the next hop device, and the signal strength between the non-sink device and the next hop device.

2. The method for establishing a route in a connectionless mesh network of claim 1, wherein the information is broadcast through a management frame or a control frame.

3. The method for establishing a route in a connectionless mesh network of claim 2, wherein the management frame is a beacon.

4. A system for establishing a route in a connectionless mesh network, comprising a plurality of sink devices and a plurality of non-sink devices;

wherein each of the plurality of the sink devices is configured to:
   a signal strength between the sink device and an external router; and
   periodically broadcast information to one or more surrounding devices of the sink device, wherein the information comprises information indicating the sink device as a sink, a MAC address of the sink device, and a signal strength between the sink device and an external router;
wherein each of the plurality of the non-sink devices is configured to:
   monitor information broadcast by one or more surrounding devices of the non-sink device and detecting signal strengths between the non-sink device and the one or more surrounding devices of the non-sink device; and
   determine whether the information broadcast by the sink devices is present; if so, the non-sink device selects a sink device having a highest signal strength therewith from the plurality of sink devices as a next hop device thereof, and the non-sink device periodically broadcasts information to one or more surrounding devices of the non-sink device, wherein the information comprises a number of hops from the non-sink device to the sink device having a highest signal strength therewith, a MAC address of the sink device having a highest signal strength therewith, and the signal strength between the non-sink device and the sink device having a highest signal strength therewith; if not, the non-sink device selects a device having a highest signal strength therewith as the next hop device, and the non-sink device periodically broadcasts information to one or more surrounding devices of the non-sink device, wherein the information comprising the number of hops from the non-sink device to a sink device from the plurality of the sink devices, a MAC address of the next hop device of the non-sink device, and the signal strength between the non-sink device and the next hop device.

5. The system for establishing a route in a connectionless mesh network of claim 4, wherein each sink device and each non-sink device are, respectively, further configured to forward data to the external router connected with the sink device according to the established route in the connectionless mesh network.

6. The system for establishing a route in a connectionless mesh network of claim 4, wherein each of the plurality of the sink devices is further configured to:
   encapsulate the information comprising the information indicating the sink device as a sink, the MAC address of the sink device, and the signal strength between the sink device and the external router into a management frame or a control frame; and
   periodically broadcast the management frame or the control frame to the one or more surrounding devices of the sink device.

7. The system for establishing a route in a connectionless mesh network of claim 4, wherein each of the plurality of the non-sink devices is configured to:
   determine whether the information broadcast by the sink device is present;
   if the information broadcast by the sink device is present, select a sink device having a highest signal strength with the non-sink device as a next hop device; and, if not, select a device having the highest signal strength with the non-sink device as the next hop device;
   if the information broadcast by the sink device is present, encapsulate the information comprising the number of hops from the non-sink device to the sink device, the MAC address of the sink device, and the signal strength between the non-sink device and the sink device into the management frame or the control frame; and, if not, encapsulate the information comprising the number of hops from the non-sink device to the sink device, the MAC address of the next hop device, and the signal strength between the non-sink device and the next hop device into the management frame or the control frame; and
   periodically broadcast the management frame or the control frame to the one or more surrounding devices of the non-sink device.

* * * * *